Sept. 6, 1927.
M. F. CARR
1,641,917
FASTENER
Filed Nov. 18, 1924
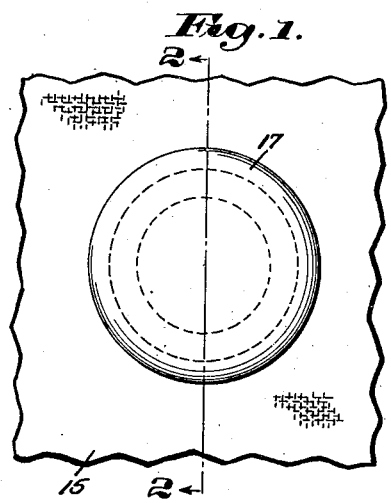
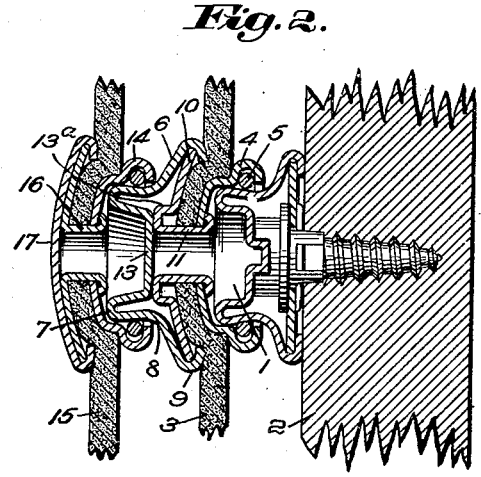
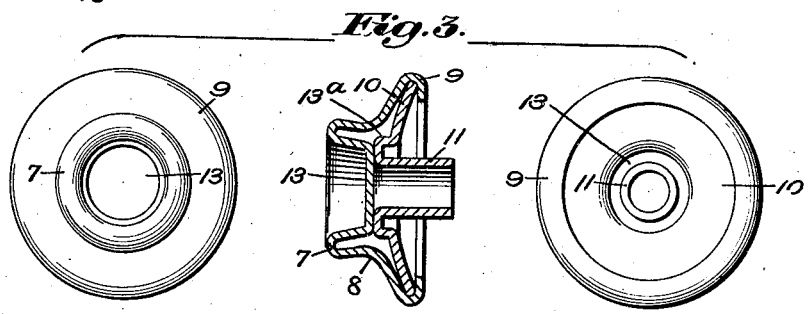
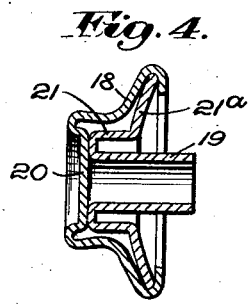
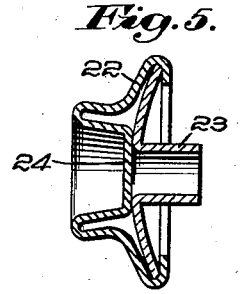
Inventor:
Moses F. Carr,
by Emery Booth Janney Varney
Attys.

Patented Sept. 6, 1927.

1,641,917

UNITED STATES PATENT OFFICE.

MOSES F. CARR, OF LEXINGTON, MASSACHUSETTS, ASSIGNOR TO CARR FASTENER COMPANY, OF CAMBRIDGE, MASSACHUSETTS, A CORPORATION OF MAINE.

FASTENER.

Application filed November 18, 1924. Serial No. 750,587.

This invention aims to provide improvements in a separable fastener.

In the drawings, which illustrate a preferred and two modified forms of my invention:—

Figure 1 is a front elevation of the preferred form of fastener;

Fig. 2 is a section on the line 2—2 of Fig. 1, being partly in elevation and showing a stud secured to a rigid support, a stud and socket secured to a flexible support and a socket secured to a second flexible support, all of which are secured to each other;

Fig. 3 is a front elevation, cross-section and rear elevation respectively of the preferred form of fastener stud;

Fig. 4 is a longitudinal section of a modified form of fastener stud; and

Fig. 5 is a longitudinal section of a second modified form of fastener stud.

Referring to the drawings and to the preferred form of my invention illustrated in connection with Figs. 1, 2 and 3, I have shown, for illustrative purposes only, the manner in which two curtains may be secured to the body of an automobile, and the use of my invention which pertains to the attaching means and means for supporting the attaching means as shown in combination with the stud which is secured (Fig. 2) to the inner curtain.

While the stud, as illustrated in Fig. 2, is shown in connection with a socket secured to the opposite face of the same curtain, it will be understood that the same stud may be secured to a curtain at one side thereof without the use of a socket at the opposite side thereof.

Referring now to Fig. 2, I have shown a stud 1 secured to the body 2 of an automobile, or the like, and the construction of the stud is substantially as shown and described in United States Letters Patent No. 1,433,783 issued October 31, 1922, to Carr Fastener Company, assignee of Moses F. Carr.

The inner curtain 3 presents at its inner face a socket 4 containing a spring 5 for engagement with the neck of the stud 1. At the opposite side of the curtain 3, I have provided a second stud 6, which presents means for securing it and the socket 4 to the curtain 3.

Heretofore, studs of a similar construction to the one herein illustrated have been assembled with three parts, namely, a socket-engaging part, a rivet or attaching part and a separate plate for back-supporting the rivet while it is being upset against a suitable clench plate to secure the stud to a support.

In the preferred form of my invention, however, the stud comprises only a socket-engaging stud 6, being a head 7, neck 8 and base portion 9, and a dish-shaped disc or flange 10 secured to said base and presenting a tubular rivet 11.

The rivet in this instance, instead of being supported by a separate plate, is supported by the closed end of a depressed portion 13 pressed from the head of the stud toward the base thereof.

The depressed portion 13, as illustrated, seats against a bossed portion 13ª pressed from the flange 10 of the rivet, thereby forming a strong, rigid support for the rivet when it is being headed over to secure the stud 6 to one side of the curtain 3 and the socket to the other side, as illustrated in Fig. 2.

A second socket 14 substantially like the socket 4 is secured to the outer curtain 15 by a rivet 16 held in a cap 17 at the opposite side of the curtain, and this socket may be engaged with the stud 6, as illustrated.

Thus by means of the above-mentioned separable fasteners, the curtains 3 and 15 may be secured to the body 2 of the automobile, as illustrated in Fig. 2.

Referring now to the modified form of my invention, as illustrated in Fig. 4, I have shown a stud 18, a rivet 19 and a depressed portion 20 for supporting the rivet.

In this instance, the depressed portion extends only a slight distance toward the base of the stud and the bossed portion 21 of the rivet extends upwardly from the flange 21ª of the rivet a relatively greater distance than the bossed portion 13ª of the preferred form of rivet.

The second modified form of my invention, illustrated in Fig. 5, shows a still further construction of rivet-supporting means.

The stud 22, as illustrated, includes a rivet 23 which has no bossed portion as shown in the other forms of my invention. In this instance, the depressed portion 24 extends a relatively greater distance toward the base of the stud than in the preferred form of my invention, thereby to support the rivet without the use of a boss.

While I have shown and described preferred and modified forms of embodiments of my invention, it will be understood that changes involving omission, alteration, substitution and reversal of parts, and even changes in the mode of operation, may be made without departing from the scope of my invention, which is best defined in the following claims.

I claim:

1. A separable fastener stud unit including a head, a neck and a base portion, an attaching rivet secured to said base portion prior to attachment of the stud to a support, and means formed interiorly of the head of said stud for back-supporting said rivet when being upset at the opposite side of the stud support.

2. A separable fastener stud unit including an attaching rivet assembled therewith for securing said stud to a support, and a depressed portion in the head of said stud for back-supporting said rivet when being upset at the opposite side of the stud support.

3. A separable fastener stud unit having a head, a neck and a base portion, a tubular attaching rivet secured to said base portion prior to attachment of the stud to a support, and means pressed from the head of said stud to engage and support said rivet when said stud is being secured to a stud-carrying support.

4. A separable fastener stud unit having a head, a neck, and a base, an attaching rivet having a flange assembled with the base of said stud prior to attachment to a support, a tubular rivet part extending at both sides of said flange and a rivet-supporting portion extending from said head toward said base and seated against the tubular portion of said rivet to provide a support therefor when said stud is being secured to a support.

5. A separable fastener stud unit having a head, a neck, and a base portion, an attaching rivet secured to said base portion prior to attachment of the stud unit to a support, said attaching rivet having a flange, a boss extending from said flange toward the head of said stud unit, a hollow rivet portion extending from said boss and a support pressed from the head of said stud unit for engagement with said boss, thereby to support the said hollow rivet portion.

6. A separable fastener stud unit including a head, a neck and a base portion, an attaching rivet secured to said base, prior to attachment of the stud to a support, a boss extending from the flange of said rivet toward the head of said stud, a hollow rivet portion extending from said boss beyond the base of said stud, and a support pressed from the head of said stud for engagement with said boss, thereby to support said rivet.

7. A plural fastener installation including a stud and a socket secured to opposite sides of a single carrying medium, said stud presenting assembled therewith a depending tubular rivet and a head presenting a depressed portion interiorly thereof bearing against and back-supporting said rivet, said socket presenting a casing having a rivet-receiving aperture therethrough, said rivet passed through the carrying medium, through said aperture and clenched against the inner face of said socket.

In testimony whereof, I have signed my name to this specification.

MOSES F. CARR.